(12) United States Patent
Treinen

(10) Patent No.: US 9,662,975 B2
(45) Date of Patent: May 30, 2017

(54) SELF-PROPELLED OFF-ROAD VEHICLE WITH EXTREME PRESSURE HYDRAULIC PROPEL CIRCUIT PROTECTION

(71) Applicant: CNH Industrial America LLC, New Holland, PA (US)

(72) Inventor: Kerry J. Treinen, Malone, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/131,476

(22) Filed: Apr. 18, 2016

(65) Prior Publication Data

US 2016/0318393 A1 Nov. 3, 2016

Related U.S. Application Data

(60) Provisional application No. 62/154,828, filed on Apr. 30, 2015.

(51) Int. Cl.
*B60K 25/04* (2006.01)
*A01B 76/00* (2006.01)
*B60K 17/10* (2006.01)

(52) U.S. Cl.
CPC ............. *B60K 25/04* (2013.01); *A01B 76/00* (2013.01); *B60K 17/10* (2013.01); *B60Y 2200/22* (2013.01)

(58) Field of Classification Search
CPC ...... B60K 25/04; B60K 17/10; B60K 17/105; B60K 17/14; A01B 76/00; B60Y 2200/22
USPC ................................ 180/305, 306, 307, 308
See application file for complete search history.

(56) References Cited

U.S. PATENT DOCUMENTS

| 4,213,300 A | 7/1980 | Biskis |
| 4,236,595 A | 12/1980 | Beck et al. |
| 4,373,669 A | 2/1983 | Swanson |
| 4,667,763 A * | 5/1987 | Nembach ............... B60K 23/08 |
| | | 180/243 |
| 5,546,751 A | 8/1996 | Last |

(Continued)

FOREIGN PATENT DOCUMENTS

| EP | 2064948 B1 | 6/2009 |
| EP | 2153710 A2 | 2/2010 |

OTHER PUBLICATIONS

NPL_spraysmarter: Teejet 3/4" Pressure Relief Valve; web-site—URL: http://www.spraysmarter.com/teejet-3-4-pressure-relief-valve.html, 2014; US.

*Primary Examiner* — John Walters
(74) *Attorney, Agent, or Firm* — Rebecca L. Henkel; Rickard K. DeMille

(57) ABSTRACT

A self-propelled off-road agricultural vehicle is provided with a hydraulic propel circuit protection system. The hydraulic propel circuit protection system reduces extreme pressure buildup from the motors when the pumps and/or motors are rapidly deactivated. The hydraulic propel circuit protection system may include a propel manifold with integral valving and an accumulator to protect a propel circuit of the self-propelled off-road agricultural vehicle. External relief valves which may be integrated into the propel manifold may limit the high pressure condition on the outlet of the motors to a level that prevents damage to the hydraulic motors and the accumulator provides supplemental flow and thus prevents the extremely low pressure condition from occurring at either side of the motors.

20 Claims, 4 Drawing Sheets

(56) References Cited

U.S. PATENT DOCUMENTS

| | | | |
|---|---|---|---|
| 6,053,419 | A | 4/2000 | Krohn et al. |
| 6,438,951 | B2 | 8/2002 | Morgan |
| 6,877,577 | B1 | 4/2005 | Smith |
| 7,155,907 | B2 | 1/2007 | Desjardins et al. |
| 7,290,389 | B2 | 11/2007 | Singh |
| 7,293,841 | B2 * | 11/2007 | Perkins .................. B60T 1/062 180/306 |
| 8,375,982 | B2 | 2/2013 | Gray, Jr. |
| 8,919,113 | B2 | 12/2014 | Ma et al. |
| 9,079,470 | B2 | 7/2015 | Slawson |
| 9,120,470 | B2 * | 9/2015 | Harada ..................... B60T 7/12 |
| 9,217,447 | B2 * | 12/2015 | Dybing ............... F16H 61/4148 |
| 2013/0000293 | A1 | 1/2013 | Dybing |
| 2013/0261923 | A1 | 10/2013 | Harada |

* cited by examiner

SELF-PROPELLED OFF-ROAD VEHICLE WITH EXTREME PRESSURE HYDRAULIC PROPEL CIRCUIT PROTECTION

CROSS REFERENCE TO RELATED APPLICATIONS

This is a non-provisional application based upon U.S. provisional patent application Ser. No. 62/154,828, entitled "Self-propelled Off-road Vehicle with Extreme Pressure Hydraulic Propel Circuit," filed Apr. 30, 2015, which is incorporated herein by reference.

FIELD OF THE INVENTION

The invention relates generally to agricultural product application equipment, such as self-propelled sprayers and, in particular, to a self-propelled off-road agricultural vehicle with a hydraulic propel circuit protection system that reduces extreme pressure buildup in wheel drive motors when a pump(s) feeding the motors and/or the motors themselves are rapidly deactivated.

BACKGROUND OF THE INVENTION

Self-propelled sprayers are getting larger to increase operating efficiency by covering more area in a single pass of a praying session. The larger self-propelled sprayers arc also getting heavier. Hydraulic drive systems have been effectively used to power the wheels of these larger self-propelled sprayers, which allows for increased ground clearance because of the absence of mechanical driveline components for the hydraulic drive systems. Even though the self-propelled sprayers arc large machines, their hydraulic drive systems must be designed to allow the self-propelled sprayers to travel at relatively high speeds on the road, such as at about 30 mph. When traveling at such high speeds, if the pumps and/or motors are rapidly deactivated, which may oceaur during hard braking events or loss of signal to the pumps, then the rotational inertia of the large wheels and planetary gear sets tends to keep rotating the output shafts of the motors at high speeds. This turns the motors into pumps. Since fluid is not flowing through the pumps at this time, this high speed inertial driving of the motors can cause failures at the motors. The high speed inertial driving failures can correspond to an extremely low pressure and possible cavitation on the motor input side and extremely high pressure on the motor output side. When this condition occurs, the motor block can lift and allow high pressure to enter the motor case drain cavity. This high pressure can cause failures of speed sensor, allowing the high pressure to push the speed sensors out of the motor housings and cause corresponding loss of hydraulic fluid. These severe pump and motor conditions can also occur if the electronic control of the pumps and motors is lost due to a cut wire, coil failure, or control failure.

SUMMARY OF THE INVENTION

A self-propelled off-road agricultural vehicle is provided with a hydraulic propel circuit protection system. The hydraulic propel circuit protection system reduces extreme pressure buildup from the motors when the pumps and/or motors are rapidly deactivated.

According to one aspect of the invention, the hydraulic propel circuit protection system may include a propel manifold with integral valving and an accumulator to protect a propel circuit of the self-propelled off-road agricultural vehicle. The integral valving of the propel manifold may include at least one relief valve(s) that is configured to prevent excessive pressures at outlets of hydraulic wheel motors. The accumulator is configured to provide supplemental flow through the propel manifold to the wheel motors to prevent low-pressure conditions at the wheel motors.

According to another aspect of the invention, external relief valves limit the high pressure condition on the outlet of the motors to a level that prevents damage to the hydraulic motors. The accumulator provides supplemental flow and thus prevents the extremely low pressure condition from occurring at either side of the motors. By preventing the high and low pressures across the wheel motors damage to the propel circuit is prevented.

According to another aspect of the invention, instead of directly connecting the pumps to the motors as is typical, a propel manifold is arranged between the pumps and motors. All of the hydraulic fluid flowing out of the pumps is directed through the propel manifold where it is separated into distinct flow paths to the hydraulic lines feeding the separate hydraulic motors. All of the hydraulic fluid flowing from out of the motors is directed back through the propel manifold where it is then directed back to the pumps. The propel manifold incorporates the relief valves and an accumulator to provide the extreme pressure buildup protection for the propel circuit.

According to another aspect of the invention, a self-propelled off-road agricultural vehicle is provided with a hydraulic propel circuit protection system reducing extreme pressure buildup. The self-propelled off-road agricultural vehicle includes a chassis having wheels for moving the off-road self-propelled agricultural vehicle and planetary gear sets arranged for rotating the wheels. An application system is supported by the chassis and includes at least one storage container storing a volume of product for delivery on to an agricultural field. A hydrostatic drivetrain system for delivering power to the wheels includes an internal combustion engine supported by the chassis. A hydrostatic pump system receives torque from the internal combustion engine and converts the torque from the internal combustion engine into hydraulic power for use by the hydrostatic drivetrain system. Hydraulic motors receive hydraulic power from the hydrostatic pump system and are arranged for delivering power to the planetary gear sets for rotating the wheels. Each hydraulic motor has an inlet side receiving hydraulic fluid into the hydraulic motor from the hydrostatic pump system for driving rotation of the wheels and an outlet side releasing hydraulic fluid out of the hydraulic motor toward the hydrostatic pump system. A hydraulic propel circuit protection system is operably connected to each of the hydraulic motors. The hydraulic propel circuit protection system is configured to attenuate pressure increases at the outlet side of each hydraulic motor and pressure decreases at the inlet side of each hydraulic motor.

According to another aspect of the invention, the hydraulic propel circuit protection system is arranged between the hydrostatic pump system and each of the hydraulic motors. A hydraulic distribution manifold defining a propel manifold may operably interconnect the hydrostatic pump system to each of the hydraulic motors. The hydraulic propel circuit protection system may be arranged at least partially in and/or operate through the propel manifold.

According to another aspect of the invention, rapid deactivation of the hydraulic pumps and/or motors leads to inertial motor driving events, during which rotational inertia of the wheels and the planetary gear sets inertially drive the hydraulic motors establishing pressure differentials between the intake and outlet sides of the hydraulic motors. The hydraulic propel circuit protection system is configured to attenuate the pressure differentials across the inlet and outlet sides of each hydraulic motor. This is done by decreasing pressures at the outlet sides of the hydraulic motors and increasing pressures at the inlet sides of the hydraulic motors during the inertial motor driving events.

According to another aspect of the invention, the hydraulic propel circuit protection system includes at least one pressure relief valve fluidly connected to the outlet sides of the hydraulic motors. The at least one pressure relief valve is configured to limit pressure of the outlet sides of the hydraulic motors below an upper threshold pressure value in response to pressure increases at the outlet sides of the hydraulic motors during the inertial motor driving events.

According to another aspect of the invention, the hydraulic propel circuit protection system includes at least one accumulator fluidly connected to the inlet sides of the hydraulic motors, such as by way of the propel manifold. The at least one accumulator is configured to provide supplemental hydraulic fluid flow to the hydraulic motors to maintain minimum pressure on the inlet sides of the hydraulic motors in response to pressure drops at the inlet sides of the hydraulic motors during the inertial motor driving events.

According to another aspect of the invention, the hydrostatic pump system includes a tandem pair of variable displacement hydrostatic pumps. Each of the hydraulic motors may be a variable displacement hydraulic motor.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
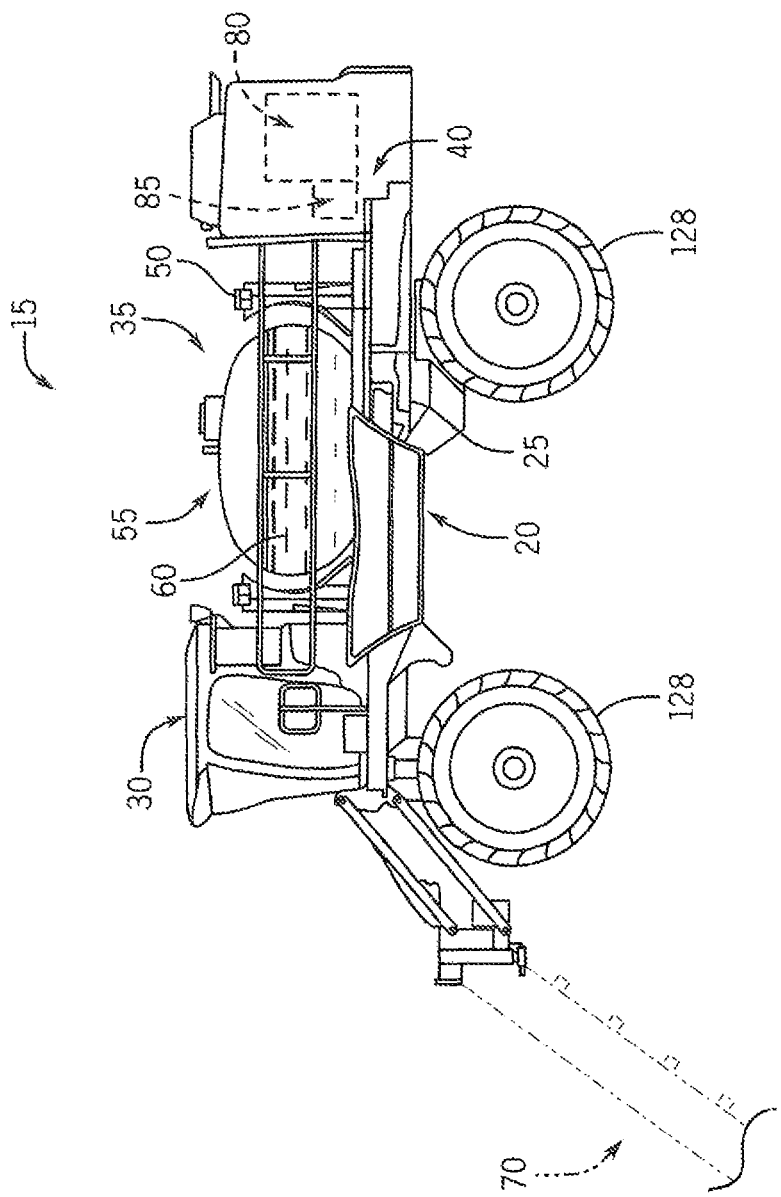
FIG. 1 is a side elevation view of self-propelled off-road agricultural vehicle with a hydraulic propel circuit protection system according to the present invention.

Referring now to the drawings and specifically to FIG. 1, a hydraulic propel circuit protection system 5 is provided that reduces extreme pressure buildup in wheel drive motors when a pump(s) feeding the motors and/or the motors themselves are rapidly deactivated, explained in greater detail elsewhere herein, and is shown for use with self-propelled off-road agricultural vehicle. The self-propelled off-road agricultural vehicle may be an agricultural applicator that deposits, for example, liquid, as well as dry and gaseous product, above and below ground, pre-emerge and post-emergence or sprouting of the crop, which includes operations such as seeding, inter-seeding, fertilizing and application of for example, herbicides, fungicides, and insecticides as well as soil conditioners, growth retardants, and other agents, such as by way of various toolbar attachments, planters, anhydrous ammonia applicators, and others. The self-propelled off-road agricultural vehicle as agricultural applicator may be a sprayer and is shown here as a self-propelled sprayer 15. Sprayer 15 is shown as a front-mounted boom self-propelled sprayer such as those available from CNH Industrial, including the Miller Nitro and the New Holland Guardian Series front-mounted boom sprayers. Although sprayer 15 is shown as a front-mounted boom self-propelled sprayer, it is understood that self-propelled versions of sprayer 15 can have either front-mounted, mid-mount, or rear-mounted booms, as well boom-less sprayers, tiered booms, and detachable sprayers.

Still referring to FIG. 1, sprayer 15 includes chassis 20 having chassis frame 25 that supports various assemblies, systems, and components. These various assemblies, systems, and components include cab 30, and an application system shown as spray system 35, and a hydrostatic drivetrain system 40. Spray system 35 includes storage containers such as rinse tank 50 storing water or a rinsing solution and product tank 55 that stores a volume of product 60 for delivery onto an agricultural field with sprayer 15. Product 60 includes any of a variety of agricultural liquid products, such as various pesticides, herbicides, fungicides, liquid fertilizers, and other liquids including liquid suspensions beneficial for application onto agricultural fields. A product delivery pump conveys product 60 from product tank 55 through plumbing components such as interconnected pieces of tubing and through a foldable and height-adjustable boom of a boom system 70 for release out of spray nozzles that are spaced from each another along the width of boom during spraying operations of applicator 15.

Figure 2:
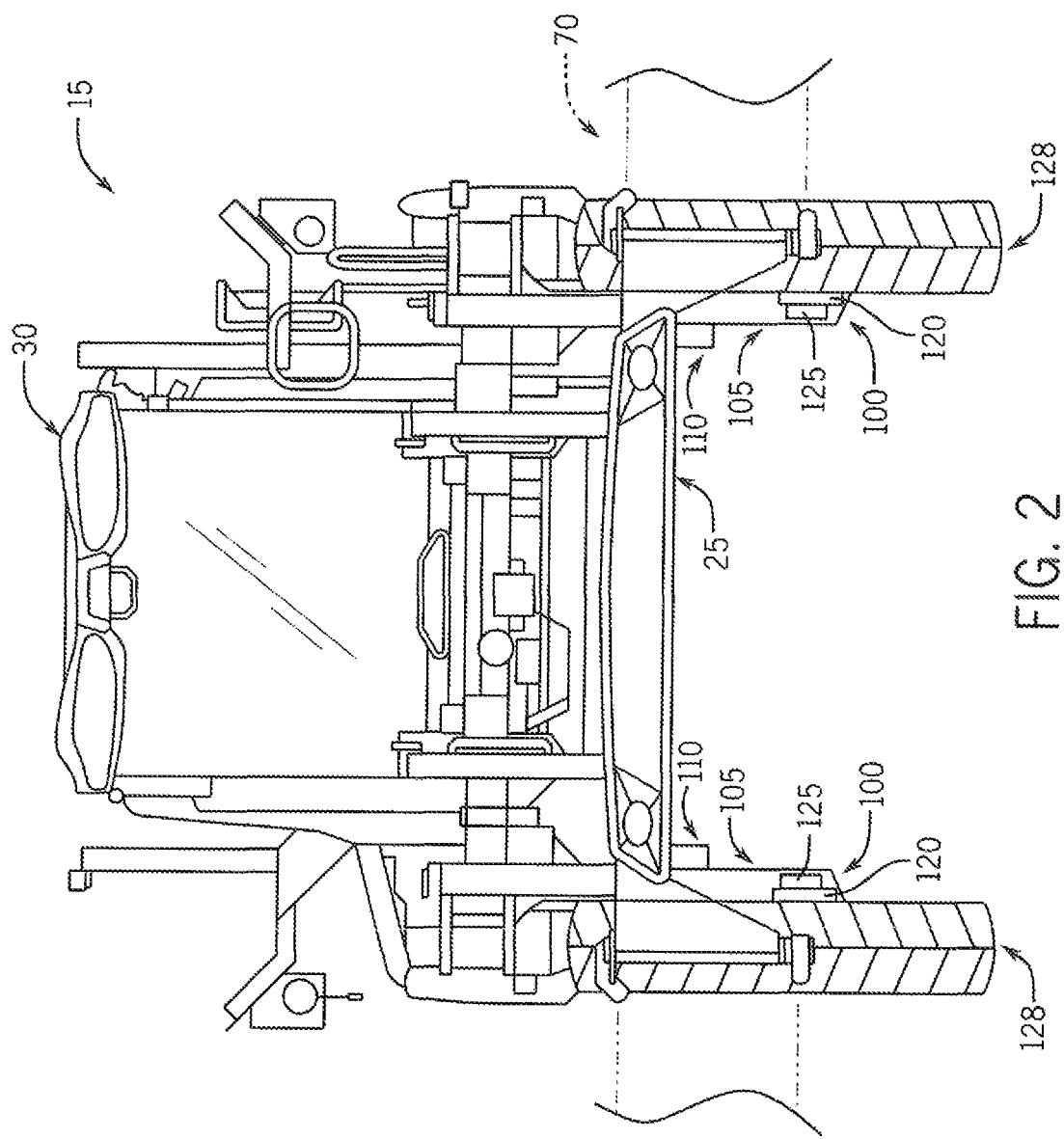
FIG. 2 is a front elevation view of the self-propelled off-road agricultural vehicle of FIG. 1.
Figure 3:
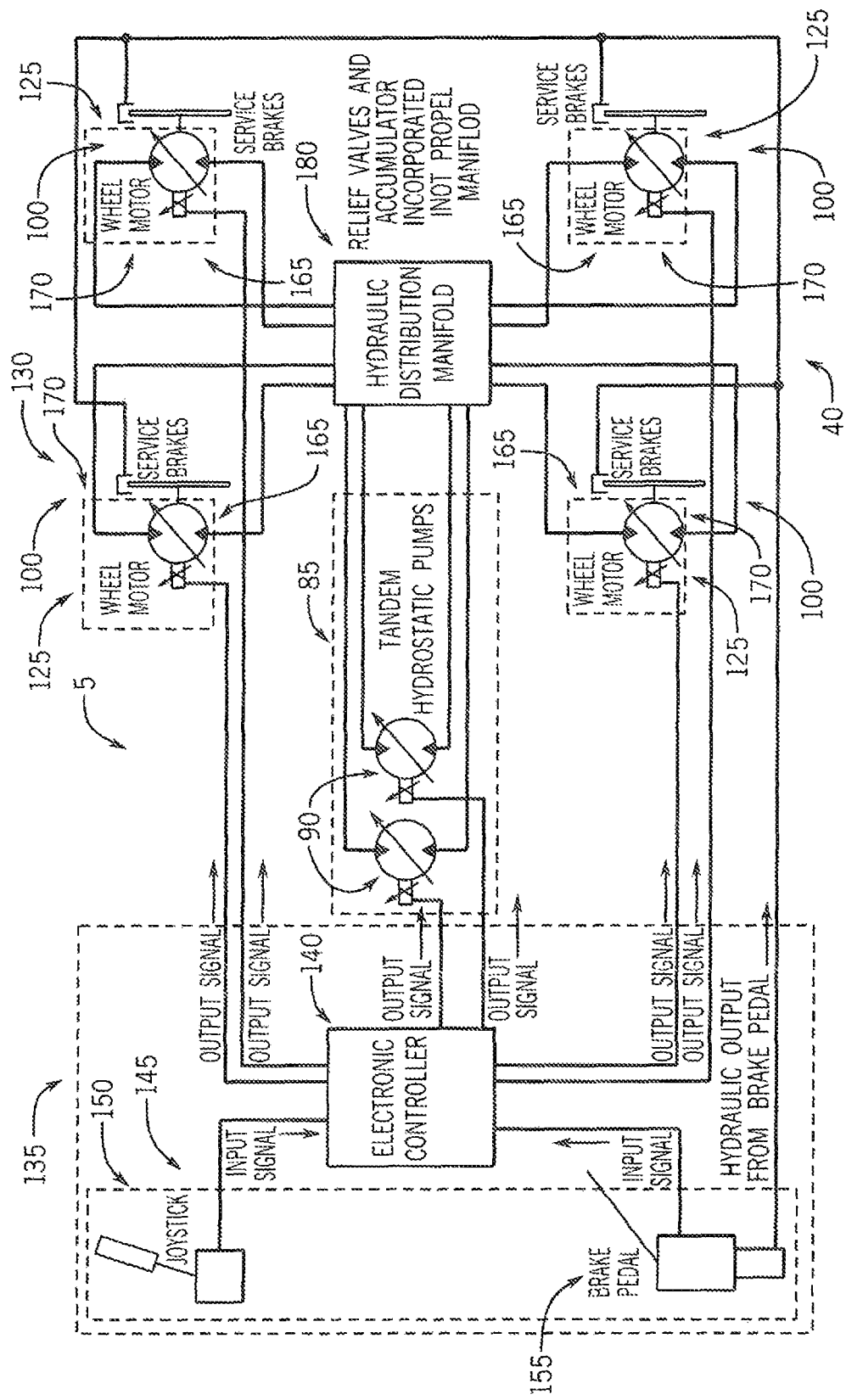
FIG. 3 is a simplified schematic representation of a propel circuit with a hydraulic propel circuit protection system according to the present invention.

Still referring to FIG. 1, the hydrostatic drivetrain system 40 includes engine 80 and hydrostatic pump system 85 that receives power from engine 35. FIG. 3 shows hydrostatic pump system 85 as having a tandem pair of variable displacement hydrostatic pumps 90. Referring now to FIG. 2, wheel drives 100 are supported at bottom ends of legs 105 that extend from swing arms 110 that are pivot mounted to chassis frame 25. Each wheel drive 100 includes a planetary gear set 120 and a hydraulic motor as a wheel motor 125 which may be a variable displacement wheel motor (FIG. 3) that directly drives the planetary gear set 120 to establish a direct drive relationship between each wheel drive 100 and its respective wheel 128 of the sprayer 15.

Referring now to FIG. 3, a propel circuit 130 is shown that includes the hydrostatic pump system 85, wheel motors 125, and control system 135 that controls the propel circuit 130. Control system 135 includes at least one electronic controller 140 that is configured to control operations of the hydrostatic drivetrain system 40. Electronic controller 140 includes a microprocessor and may be implemented as a programmable logic controller (PLC) or other industrial computer, along with corresponding software and suitable memory for storing such software and hardware including interconnecting conductors for power and signal transmission and communication for controlling electronic, electromechanical, and hydraulic components of the hydrostatic drivetrain system 40. Communication may be done through direct interconnection such as directly routed wiring harnesses or through. one or more serial bus systems such as a CAN (controller area network) bus(es) between the electronic controller 140 and the sensors, actuators, and/or other components of sprayer 15 for monitoring and controlling the corresponding systems and components of the hydrostatic drivetrain system 40 to control direction, speed, and braking of sprayer 15.

Still referring to FIG. 3, control system 135 includes operator controls 145, which provide a user interface(s) allowing an operator to control hydrostatic drivetrain system 40 and other components of the applicator 15. Operator controls 145 include joystick 150 that has a grip with buttons for controlling various corresponding functions of sprayer 15 including controlling operations of boom system 70 such as boom height and tilt and spray delivery patterns, as well as controlling movement characteristics of the sprayer 15 such as range and speed controls. Moving the joystick 150 forward and/or backward with respect to a neutral gate controls direction and speed of travel of sprayer 15. Operator controls 145 include brake pedal 155 with an integrated brake valve delivering pressurized hydraulic fluid upon depressing brake pedal 155 to engage service brakes 160 at each wheel drive 100 to slow rotation of the respective wheel motor 125. Depressing brake pedal 155 may also send a corresponding signal to electronic controller 140, which sends a signal to the hydrostatic pump system 85 as a deceleration command to the pumps 90 for slowing the sprayer 15. Each wheel motor 125 has an inlet side 165 receiving hydraulic fluid and an outlet side 170 returning hydraulic fluid toward the hydrostatic pump system 85. Since wheel motors 125 can bi-directionally rotate, the inlet and outlet sides 165, 170 can be the opposite depending On which direction the wheel motors 125 are rotating.

Still referring to FIG. 3, propel circuit protection system 5 includes a hydraulic distribution manifold as a propel manifold 180 that operably interconnects the hydrostatic pump system 85 to each of the wheel motors 125. Integrated and/or cooperating components of propel manifold 180 within the propel circuit protection system 5 are configured to reduce extreme positive and negative pressure buildup within the propel circuit 130 such as at the wheel motors 125 when the pumps 90 and/or wheel motors 125 are rapidly deactivated. Thus, the hydraulic propel circuit protection system 5 attenuates pressure increases and decreases respectively at the outlet and inlet sides 170, 165 of wheel motors 125 that may otherwise be sufficient to damage the wheel motors 125 upon rapid deactivation of pumps 90 and/or wheel motors 125. Rapid deactivation of pumps 90 and/or wheel motors 125 may occur during severe pump and/or motor conditions associated with hard braking events, loss of signal to the pumps 90, and/or wheel motors 125 which may include losing electronic control of the pumps 90 and/or wheel motors 125 due to a cut wire, coil failure, or control failure. The severe pump and/or motor conditions include rapid deactivation of the hydraulic pumps and/or motors that can lead to inertial motor driving events. During inertial motor driving events, rotational inertia of the wheels 128 and the planetary gear sets 120 inertially drive the wheel motors 125, whereby the wheel motors 125 act as pumps and establish pressure differentials between their intake and outlet sides 165, 170 since hydraulic fluid is substantially not flowing through the propel circuit 130, at least not as it was before the severe pump and/or motor conditions.

Figure 4:
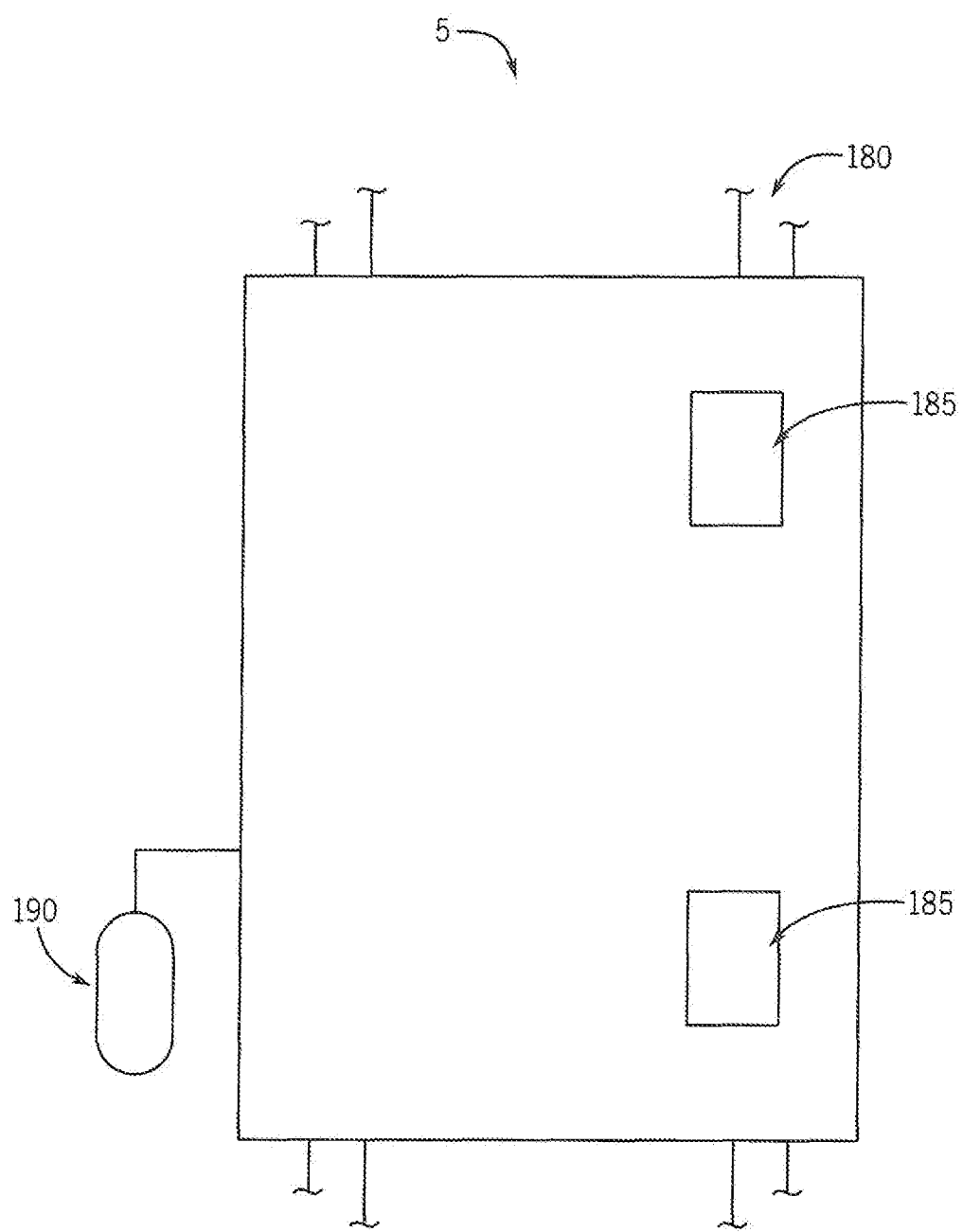
FIG. 4 is a simplified schematic representation of a propel manifold with a hydraulic propel circuit protection system according to the present invention.

Referring now to FIG. 4, propel manifold 180 may have integral valving, including at least one pressure relief valve, shown as a pair of pressure relief valves 185 for attenuating over-pressurized conditions within the wheel motors 125. Pressure relief valves 185 protect against extreme positive pressure buildup within the propel circuit 130. This is done by the pressure relief valves 185 limiting pressure of the outlet sides 170 of the wheel motors 125 below an upper threshold pressure value as determined by blow-off pressure rating of the pressure relief valves 185. The blow-off pressure rating of the pressure relief valves 185 may be at least about 4,500 PSI (pound per square inch) or about 6,000 PSI based on safe operating pressure limits of the motors 125 and/or other components within the propel circuit 130. Pressure at the wheel motors 125 that exceeds the upper threshold pressure value opens the pressure relief valves 185, allowing hydraulic fluid to flow out of the pressurized line, for example, returning to tank, which reduces pressure at the wheel motors 125 to a value below the upper threshold pressure value.

Still referring to FIG. 4. propel manifold 180 may have an integral or connected supplemental flow arrangement, shown as accumulator 190 for attenuating under-pressurized conditions within the wheel motors 125. Accumulator 190 protects against extreme negative pressure within the propel circuit 130, including cavitation at the wheel motors 125. This is done by the accumulator 190 maintaining assuring maintenance of a minimum pressure of the inlet sides 165 of the wheel motors 125, above a minimum threshold pressure value as determined by a precharge pressure value of the accumulator 190. The precharge pressure value of the actuator 190 may be at least about 100 PSI or about 150 PSI, plus or minus 25 PSI based on sate operating pressure limits of the motors 125 and/or other components within the propel circuit 130. Pressure at the wheel motors 125 that falls below the lower threshold opens the cumulative 192 the wheel motors 125, providing supplemental flow of hydraulic fluid to prevent low-pressure conditions at the wheel motors 125.

Many changes and modifications could be made to the invention without departing from the spirit thereof The scope of these changes will become apparent from the appended claims.

We claim:

1. A self-propelled off-road agricultural vehicle with a hydraulic propel circuit protection system reducing pressure buildup, the self-propelled off-road agricultural vehicle comprising:

a chassis having wheels for moving the self-propelled off-mad agricultural vehicle and planetary gear sets arranged for rotating the wheels;

an application system supported by the chassis and including at least one storage container storing a volume of product for delivery on to an agricultural field;

a hydrostatic drivetrain system for delivering power to the wheels and including, an internal combustion engine supported by the chassis, a hydrostatic pump system receiving torque from the internal combustion engine and converting the torque from the internal combustion engine into hydraulic power for use by the hydrostatic drivetrain system;

hydraulic motors receiving hydraulic power from the hydrostatic pump system and arranged for delivering power to the planetary gear sets for rotating the wheels, wherein each hydraulic motor has an inlet side receiving hydraulic fluid into the hydraulic motor from the hydrostatic pump system for driving rotation of the wheels and an outlet side releasing hydraulic fluid out of the hydraulic motor toward the hydrostatic pump system; and a hydraulic propel circuit protection system operably connected to each of the hydraulic motors with the hydraulic propel circuit protection system configured to attenuate pressure increases at the outlet side of each hydraulic motor, and attenuate pressure decreases at the inlet side of each hydraulic motor.

2. The self-propelled off-road agricultural vehicle of claim 1 wherein the hydraulic propel circuit protection system is arranged between the hydrostatic pump system and each of the hydraulic motors.

3. The self-propelled off-road agricultural vehicle of claim 2 further comprising a hydraulic distribution manifold defining a propel manifold operably interconnecting the hydrostatic pump system to each of the hydraulic motors and wherein the hydraulic propel circuit protection system is arranged at least partially in the propel manifold.

4. The self-propelled off-road agricultural vehicle of claim 3 wherein during inertial motor driving events that correspond to rapid deactivation of the hydraulic pumps and/or motors, rotational inertia of the wheels and the planetary gear sets inertially drive the hydraulic motors establishing pressure differentials between the inlet and outlet sides of the hydraulic motors; and wherein the hydraulic propel circuit protection system is configured to attenuate the pressure differentials across the inlet and outlet sides of each hydraulic motor by decreasing pressures at the outlet sides of the hydraulic motors and increasing pressures at the inlet sides of the hydraulic motors during the inertial motor driving events.

5. The self-propelled off-road agricultural vehicle of claim 4 wherein the hydraulic propel circuit protection system includes at least one pressure relief valve fluidly connected to the outlet sides of the hydraulic motors and wherein the at least one pressure relief valve is configured to limit pressure of the outlet sides of the hydraulic motors below an upper threshold pressure value in response to pressure increases at the outlet sides of the hydraulic motors during the inertial motor driving events.

6. The self-propelled off-road agricultural vehicle of claim 5 wherein the upper threshold pressure value is 4,500 PSI (pound per square inch).

7. The self-propelled off-road agricultural vehicle of claim 4 wherein the hydraulic propel circuit protection system includes at least one accumulator fluidly connected to the inlet sides of the hydraulic motors and wherein the at least one accumulator is configured to provide supplemental hydraulic fluid flow to the hydraulic motors to maintain minimum pressures on the inlet sides of the hydraulic motors in response to pressure drops at the inlet sides of the hydraulic motors during the inertial motor driving events.

8. The self-propelled off-road agricultural vehicle of claim 4, wherein the hydrostatic pump system includes a tandem pair of variable displacement hydrostatic pumps.

9. The self-propelled off-road agricultural vehicle of claim 8, wherein each of the hydraulic motors is a variable displacement hydraulic motor.

10. The self-propelled off-road agricultural vehicle of claim 1, further comprising a brake system including a brake pedal and service brakes at each of the wheels, wherein depressing the brake pedal sends a deceleration command to the hydrostatic pump system.

11. A self-propelled off-road agricultural vehicle with a hydraulic propel circuit protection system reducing pressure buildup, the self-propelled off-road agricultural vehicle comprising:

a chassis having wheels for moving the self-propelled off-road agricultural vehicle;

a cab supported by the chassis;

planetary gear sets arranged for rotating the wheels;

a brake system including a brake pedal provided in the cab and service brakes at each of the wheels;

an application system supported by the chassis and including at least one storage container storing a volume of product for delivery on to an agricultural field;

a hydrostatic drivetrain system for delivering power to the wheels and including, an internal combustion engine supported by the chassis, a hydrostatic pump system receiving torque from the internal combustion engine and converting the torque from the internal combustion engine into hydraulic power for use by the hydrostatic drivetrain system;

hydraulic motors receiving hydraulic power from the hydrostatic pump system and arranged for delivering power to the planetary gear sets for rotating the wheels, wherein each hydraulic motor has an inlet side receiving hydraulic fluid into the hydraulic motor from the hydrostatic pump system for driving rotation of the wheels and an outlet side releasing hydraulic fluid out of the hydraulic motor toward the hydrostatic pump system; and a hydraulic propel circuit protection system operably connected to each of the hydraulic motors with the hydraulic propel circuit protection system configured to, attenuate pressure increases at the outlet side of each hydraulic motor, and attenuate pressure decreases at the inlet side of each hydraulic motor, wherein the hydraulic propel circuit protection system includes at least one pressure relief valve fluidly connected to the outlet sides of the hydraulic motors and wherein the at least one pressure relief valve is configured to limit pressure of the outlet sides of the hydraulic motors below an upper threshold pressure value in response to pressure increases at the outlet sides of the hydraulic motors during an inertial motor driving event.

12. The self-propelled off-road agricultural vehicle of claim 11 wherein the hydraulic propel circuit protection system is arranged between the hydrostatic pump system and each of the hydraulic motors.

13. The self-propelled off-road agricultural vehicle of claim 12 further comprising a hydraulic distribution manifold defining a propel manifold operably interconnecting the hydrostatic pump system to each of the hydraulic motors and wherein the hydraulic propel circuit protection system is arranged at least partially in the propel manifold.

14. The self-propelled off-road agricultural vehicle of claim 13 wherein during the inertial motor driving event that corresponds to rapid deactivation of the hydraulic pumps and/or motors, rotational inertia of the wheels and the planetary gear sets inertially drive the hydraulic motors establishing pressure differentials between the inlet and outlet sides of the hydraulic motors; and wherein the hydraulic propel circuit protection system is configured to attenuate the pressure differentials across the inlet and outlet sides of each hydraulic motor by decreasing pressures at the outlet sides of the hydraulic motors and increasing pressures at the inlet sides of the hydraulic motors during the inertial motor driving events.

15. The self-propelled off-road agricultural vehicle of claim 14 wherein the hydraulic propel circuit protection system includes at least one accumulator fluidly connected to the inlet sides of the hydraulic motors and wherein the at least one accumulator is configured to provide supplemental hydraulic fluid flow to the hydraulic motors to maintain minimum pressures on the inlet sides of the hydraulic motors in response to pressure drops at the inlet sides of the hydraulic motors during the inertial motor driving events.

16. The self-propelled off-road agricultural vehicle of claim 14, wherein the hydrostatic pump system includes a tandem pair of variable displacement hydrostatic pumps.

17. The self-propelled off-road agricultural vehicle of claim 16, wherein each of the hydraulic motors is a variable displacement hydraulic motor.

18. The self-propelled off-road agricultural vehicle of claim 11, wherein depressing the brake pedal sends a deceleration command to the hydrostatic pump system.

19. A method for reducing pressure buildup in self-propelled off-road agricultural vehicle having a chassis including wheels for moving the self-propelled off-road agricultural vehicle, planetary gear sets arranged for rotating the wheels, and an application system supported by the chassis and including at least one storage container storing a volume of product for delivery on to an agricultural field, the method comprising:

receiving torque from an internal combustion engine supported by the chassis and converting the torque from the internal combustion engine into hydraulic power for use by a hydrostatic drivetrain system;

delivering the hydraulic power from the hydrostatic drivetrain system to hydraulic motors, and delivering power from the hydraulic motors to the planetary gear sets for rotating the wheels, wherein each hydraulic motor has an inlet side receiving hydraulic fluid into the hydraulic motor from the hydrostatic pump system for driving rotation of the wheels and an outlet side releasing hydraulic fluid out of the hydraulic motor toward the hydrostatic pump system; and at least one of attenuating pressure increases at the outlet side of each hydraulic motor and attenuating pressure decreases at the inlet side of each hydraulic motor using a hydraulic propel circuit protection system operably connected to each of the hydraulic motors.

20. The method of claim 19, further comprising limiting pressure of the outlet sides of the hydraulic motors below an upper threshold pressure value in response to pressure increases at the outlet sides of the hydraulic motors during an inertial motor driving event.

* * * * *